(12) United States Patent
Sozer et al.

(10) Patent No.: US 12,255,557 B2
(45) Date of Patent: Mar. 18, 2025

(54) DYNAMIC INTERLEAVING FOR DUAL THREE PHASE ELECTRIC MACHINE AND THREE PHASE WIRELESS CHARGING SYSTEM

(71) Applicants: Yilmaz Sozer, Peninsula, OH (US); Anik Chowdhury, Akron, OH (US); Md Ehsanul Haque, Akron, OH (US)

(72) Inventors: Yilmaz Sozer, Peninsula, OH (US); Anik Chowdhury, Akron, OH (US); Md Ehsanul Haque, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 153 days.

(21) Appl. No.: 17/940,448

(22) Filed: Sep. 8, 2022

(65) Prior Publication Data

US 2023/0077771 A1 Mar. 16, 2023

Related U.S. Application Data

(60) Provisional application No. 63/277,239, filed on Nov. 9, 2021, provisional application No. 63/241,729, filed on Sep. 8, 2021.

(51) Int. Cl.
*H02P 21/05* (2006.01)
*H01F 38/14* (2006.01)
*H02J 50/10* (2016.01)
*H02P 25/03* (2016.01)

(52) U.S. Cl.
CPC ............. *H02P 21/05* (2013.01); *H01F 38/14* (2013.01); *H02P 25/03* (2016.02); *H02J 50/10* (2016.02)

(58) Field of Classification Search
CPC ........ H02P 25/03; H02P 27/085; H02P 21/05; H02P 25/22; H02M 7/53878; H02M 1/0043; H02M 7/5395; H02M 1/15; H02M 7/53871; H01F 38/14; H01F 27/361
See application file for complete search history.

(56) References Cited

U.S. PATENT DOCUMENTS

| | | | |
|---|---|---|---|
| 8,115,433 | B2 | 2/2012 | Welchko |
| 8,269,434 | B2 | 9/2012 | Welchko et al. |
| 8,373,372 | B2 | 2/2013 | Su |

(Continued)

OTHER PUBLICATIONS

Wang et al., Selective Torque Harmonic Elimination for Dual Three-Phase PMSMs Based on PWM Carrier Phase Shift, IEEE Transactions on Power Electronics, vol. 35, No. 12, pp. 13255-13269, Dec. 2020.

(Continued)

*Primary Examiner* — Said Bouziane
(74) *Attorney, Agent, or Firm* — RENNER KENNER GREIVE BOBAK TAYLOR & WEBER

(57) ABSTRACT

A method of operating a motor includes providing an electric system coupled with the motor, the electric system including parallel inverter legs; subjecting the motor to a first interleaving angle when the electric system is under a first condition; and subjecting the motor to a second interleaving angle different from the first interleaving angle when the electric system is under a second condition; wherein the steps of subjecting the motor to the first interleaving angle and subjecting the motor to the second interleaving angle occur within continuous operation of the electric system and the motor.

18 Claims, 12 Drawing Sheets

(56) References Cited

U.S. PATENT DOCUMENTS

| | | | |
|---|---|---|---|
| 8,604,730 B2 | 12/2013 | Suzuki | |
| 8,649,195 B2 | 2/2014 | Mao et al. | |
| 2019/0363660 A1* | 11/2019 | Mao | H02P 27/12 |
| 2019/0379297 A1 | 12/2019 | Agirman | |
| 2022/0368259 A1* | 11/2022 | Hustedt | H02P 23/28 |

OTHER PUBLICATIONS

Kim et al., A Method to Minimize Current Ripple of DC Link Capacitor for 48V Inverter Integrated Starter/Generator, IEEE, 978-1-4799-7312, 2018.

\* cited by examiner

DYNAMIC INTERLEAVING FOR DUAL THREE PHASE ELECTRIC MACHINE AND THREE PHASE WIRELESS CHARGING SYSTEM

CROSS-REFERENCE TO RELATED APPLICATIONS

This application claims the benefit of U.S. Provisional Application No. 63/241,729, filed on Sep. 8, 2021, and U.S. Provisional Application No. 63/277,239, filed on Nov. 9, 2021, which are each incorporated herein by reference.

STATEMENT REGARDING FEDERALLY SPONSORED RESEARCH OR DEVELOPMENT

This invention was made with government support under DE-EE0006521-M019 awarded by the U.S. Department of Energy (DOE). The government has certain rights in the invention.

FIELD OF THE INVENTION

One or more embodiments of the present invention relate to a dynamic interleaving method. One or more embodiments of the present invention relate to a dynamic interleaving method for a dual three phase electric machine to reduce the DC-link current ripple. One or more embodiments of the present invention relate to a wireless charging system.

BACKGROUND OF THE INVENTION

Multiphase electric machines are utilized, such as in the automotive sector, due to their high torque density, efficiency, lower torque ripple, and inherent fault tolerance capability. An exemplary multiphase electric machine is a dual three phase electric machine with isolated neutral points between the dual three phases.

Certain dual three phase electric machines have utilized a constant interleaving method. This constant interleaving method purports to reduce the dc-link capacitor current and the dc-link ripple current.

In a certain instance, constant 90° or 180° interleaving angles ($\varphi$) were found to be the most appropriate angles of the drive system depending on different modulation strategies that were utilized. In another specific example, when the displacement between the two sets of three-phase windings was 0°, the most appropriate interleaving angle was found to be 180°, and when the displacement between the two sets of three-phase windings was 30°, the most appropriate interleaving angle is found to be 90°.

To the extent these interleaving methods have been proposed, these interleaving methods use a constant value for the interleaving angle within any continuous operation of the machine. However, a constant interleaving angle may not sufficiently reduce the dc-link current ripple. There remains a need in the art for further reduction of the dc-link current ripple, particularly for a dual three-phase permanent magnet synchronous machine (PMSM) drive.

Certain automotive multiphase electric systems include wireless power transfer (WPT) technology for charging an electric vehicle onboard battery. Certain conventional single phase WPT systems, and even certain conventional three-phase WPT systems, can be limited relative to efficiency and power density. There remains a need in the art for improved wireless power transfer technology.

SUMMARY OF THE INVENTION

An embodiment of the present invention provides a method of operating a motor, the method including steps of providing an electric system coupled with the motor, the electric system including parallel inverter legs; subjecting the motor to a first interleaving angle when the electric system is under a first condition; and subjecting the motor to a second interleaving angle different from the first interleaving angle when the electric system is under a second condition; wherein the steps of subjecting the motor to the first interleaving angle and subjecting the motor to the second interleaving angle occur within continuous operation of the electric system and the motor.

Another embodiment of the present invention provides a method of operating a motor, the method including steps of providing an electric system coupled with the motor, the electric system including parallel inverter legs; allowing the motor to experience a first interleaving angle when the electric system is under a first condition; and allowing the motor to experience a second interleaving angle different from the first interleaving angle when the electric system is under a second condition; wherein the steps of allowing the motor to experience the first interleaving angle and allowing the motor to experience the second interleaving angle occur within continuous operation of the electric system and the motor.

A further embodiment of the present invention provides a coil assembly including overlapping windings, the coil assembly including a plurality of phase coils; each of the plurality of phase coils including a first polar half and a second polar half to thereby provide a bi-polar structure; each of the first polar half and the second polar half including a first central linear portion extending from a first outer perimeter arc portion, where the first central linear portion and the first outer perimeter arc portion are at a top layer; a second central linear portion extending from a second outer perimeter arc portion, where the second central linear portion and the second outer perimeter arc portion are at a bottom layer; the first central linear portion and the second central linear portion extending toward a central overlapping portion, the central overlapping portion including an inner first arc portion transitioning to an upper second arc portion, the transitioning including the upper second arc portion partially overlapping the inner first arc portion.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
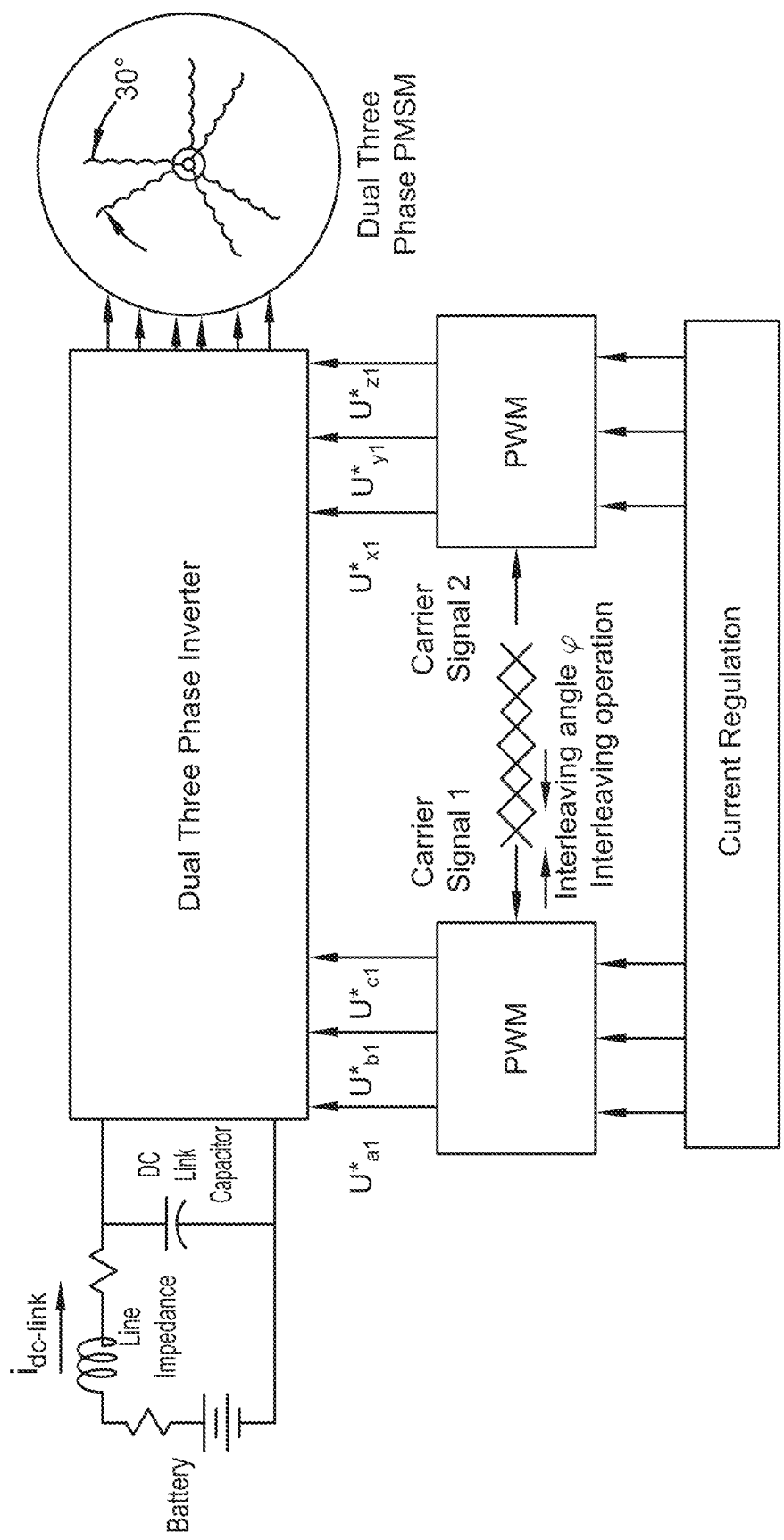
FIG. 1 is a schematic showing a dual three phase electric machine with two parallel interleaved inverters, utilizing.

One or more embodiments of the present invention relate to a dynamic interleaving method. One or more embodiments of the present invention relate to a system implementing a dynamic interleaving method. The dynamic interleaving method may be particularly useful for a dual three-phase electric machine or a coil-integrated inverter system. Advantageously, the dynamic interleaving method serves to significantly reduce DC-link current ripple and RMS current of a capacitor. In the dynamic interleaving method, a phase shift between two inverters is not fixed. In some portions of an electrical cycle, an interleaving angle (φ) is a first angle (e.g. 0 radians (0°)), while in other portions of the electrical cycle, the interleaving angle is a second angle (e.g. π radians (180°)). In this way, interleaving of the dynamic interleaving method is dynamic in behavior and therefore improves performance of a corresponding drive system. One or more embodiments of the dynamic interleaving method are particularly applicable for a discontinuous pulse width modulation (DPWM) method where the duty ratio of the switches is either 1 or 0 for some time of the electrical cycle. An exemplary DPWM method is a discontinuous space vector pulse width modulation (SVPWM) method where switches are clamped to a positive or negative rail of a DC BUS for a certain portion of the electrical cycle.

One or more embodiments of the present invention relate to a coil assembly including overlapping windings. The coil assembly includes a plurality of phase coils. A phase coil includes two polar halves, such that the overall phase coil may be referred to as a bi-polar structure. A polar half includes central linear portions extending from outer perimeter arc portions. A first central linear portion and a first outer perimeter arc portion are at a top layer and a second central linear portion and a second outer perimeter arc portion are at a bottom layer. The first central linear portion and the second central linear portion extend toward a central overlapping portion, which includes a transition from the top layer to the bottom layer. Similarly, there is a transition from the top layer to the bottom layer between the first outer perimeter arc portion and the second outer perimeter arc portion. Taken together, the two polar halves overlap to form the phase coil. In one or more embodiments, that is, for a three-phase, two-layer system, three phase coils can be utilized within the coil assembly. Advantageously, the coil assembly of one or more embodiments of the present invention provides improvements relative to higher power density and lower losses.

With reference to FIGS. 1 to 4, 11, and 12, one or more embodiments of the present invention relate to a dynamic interleaving method and a system for utilizing the method. The dynamic interleaving method generally includes utilizing a first interleaving angle under a first condition, and utilizing a second interleaving angle different from the first interleaving angle under a second condition.

With reference to FIGS. 1 to 4, a system for utilizing the dynamic interleaving method can include a dual three phase electric machine. The dual three phase electric machine can utilize two parallel interleaved inverters receiving DC current. The two parallel interleaved inverters can utilize an angular displacement angle. An exemplary angular displacement angle is π/6 radians (30°). The two parallel interleaved inverters utilize phase shifting between switching signals of pulse width modulation (PWM). This can be referred to as interleaving, and is generally applied to reduce or eliminate the switching frequency harmonics of the output torque and DC-Link current. Interleaving can also serve to reduce the noise and vibration, the torque ripple, and the DC-link ripple of the electric machine.

A first one of the two parallel interleaved inverters can include three phases (e.g. Phase A, Phase B, Phase C) and a second one of the two parallel interleaved inverters can include three phases (e.g. Phase X, Phase Y, Phase Z). Since the respective sets of three phases are at an angular displacement a first phase of one set of three phases (e.g. Phase A) will be nearby with two phases of the other set of three phases (e.g. Phase X and/or Phase Z).

When a duty ratio in any pair of nearby phases (e.g. Phase A with Phase X and/or Phase A with Phase Z) in a phase sequence diagram (FIG. 4) becomes 1 or 0, the dynamic interleaving method utilizes a first interleaving angle (e.g. 180°), which first interleaving angle can be provided to a corresponding motor. For the rest of the time (that is, when the duty ratio in any pair of nearby phases is not 1 or 0), the dynamic interleaving method utilizes a second interleaving angle (e.g. 0°), which second interleaving angle can be provided to a corresponding motor. Since the dynamic interleaving method utilizes a varying interleaving angle, the method includes dynamic interleaving.

Figure 11:
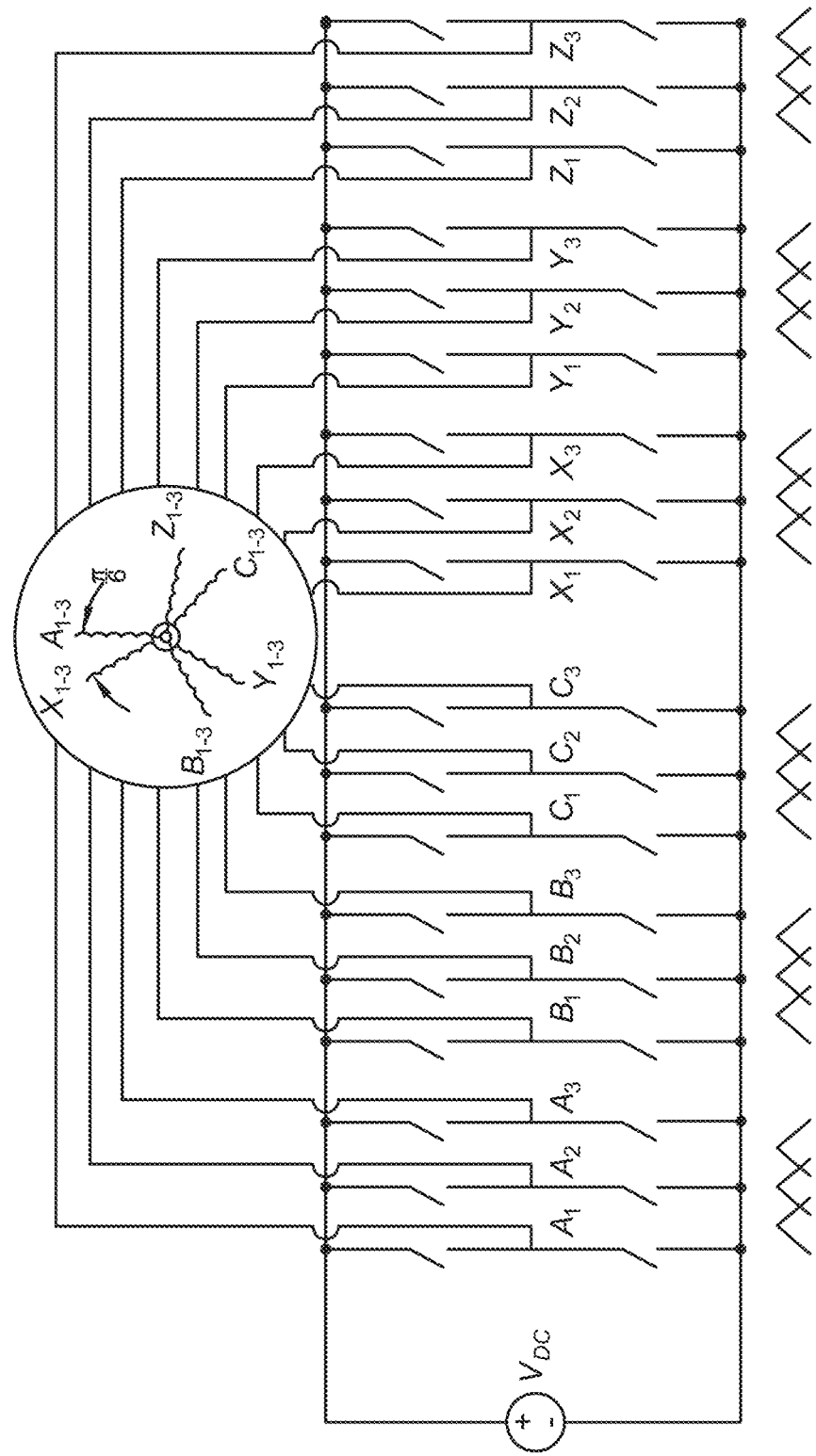
FIG. 11 is a schematic showing a distributed inverter system.
Figure 12:
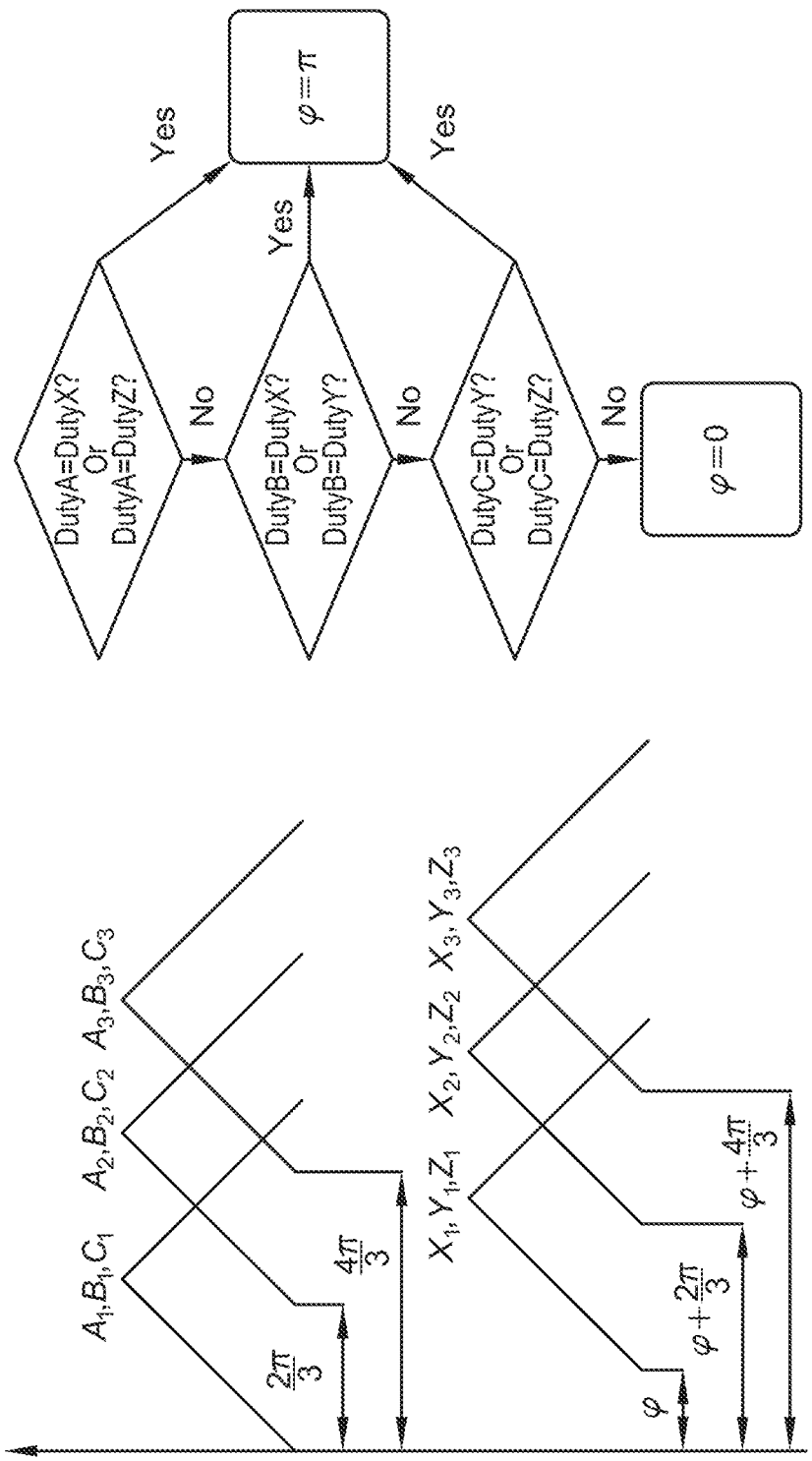
FIG. 12 is a flow chart showing implementation logic and method steps for adjusting a dynamic interleaving angle (φ)

With reference to FIGS. 11 and 12, a system for utilizing the dynamic interleaving method can include a coil-integrated inverter system. A coil-integrated inverter system distributed inverter system can be connected to an end-winding of the motor. The coil arrangement for the motor can be any suitable arrangement shown in FIG. 11. For a distributed inverter system implemented for a motor, multiple inverter legs are in parallel condition. The distributed inverter system can include a first plurality of inverter legs (e.g. A, B, C) and a second plurality of inverter legs (e.g. X, Y, Z), where the first plurality of inverter legs is at an angular displacement angle relative to the second plurality of inverter legs. An exemplary angular displacement angle is π/6 radians (30°).

The PWM signals for the legs of the inverter can be phase shifted through a combination of fixed and dynamic interleaving angle. In FIG. 11, the system is shown with two phase sets—ABC and XYZ. The ABC set has 3 phases: A, B, and C. Each phase within the set has coils, such as A1, A2, and A3. The number of coils within the phases could be more or less depending on any particular design of a machine. So the phase shift between these coils depends on the number of coils within the phase. The phase shift (at PWM frequency) would be 360/number of coils. For the specific example in FIG. 11, the number of coils within the phase is 3, so the phase shift is 120° (at PWM frequency). On top of the phase shift between the coils, there is a dynamic phase shift between the two sets. As discussed elsewhere, an exemplary dynamic phase shift between the sets includes the use of two different angles, such as 180° and 0°, at respective different conditions.

For a dynamic interleaving method for the system of FIG. 11, an exemplary logic schematic for the phase shift angle of the inverters is shown in FIG. 12. This logic schematic can result in further dc-link current ripple relative to a method without the interleaving method, which reduction can be up to a six times reduction.

Though steps and details of a method of utilizing dynamic interleaving are disclosed elsewhere herein, specific reference is now made to the following one or more steps. A first step can include providing a suitable electric machine, which may also be referred to as an electric system. As mentioned above, exemplary electric machines include a dual three phase electric machine with two parallel interleaved inverters and a coil-integrated inverter system.

A next step can include subjecting a corresponding component to a first interleaving angle when the electric machine is under a first condition, which may also be referred to as being subjected to the first condition. This may also be referred to as allowing the corresponding component to experience the first interleaving angle. An exemplary corresponding component is a motor. An exemplary first interleaving angle is 180°. An exemplary first condition is a duty ratio for any pair of nearby phases being 1 or 0. The nearby phases include a first phase of one set of three phases with the two nearest phases of the other set of three phases.

A further step can include subjecting the corresponding component to a second angle different from the first angle when the electric machine is under a second condition, which may also be referred to as being subjected to the second condition. This may also be referred to as allowing the corresponding component to experience the second interleaving angle. An exemplary second interleaving angle is 0°. An exemplary second condition is the duty ratio for any pair of nearby phases not being 1 or 0.

Though exemplary interleaving angles and conditions are provided herein, it should be readily appreciated that concepts of the present invention can extend to alternative interleaving angles and/or to alternative conditions.

Relative to the first condition and the second condition, a flag signal can be generated based on these conditions. That is, a flag signal can be utilized to give a value of 1 when the first condition indicates the interleaving angle should be the first interleaving angle and to give a value of 0 when the second condition indicates the interleaving angle should be the second interleaving angle.

In one or more embodiments, the dynamic interleaving method is utilized continuously. This reference to continuous utilization may refer to being utilized continuously for a single displacement angle (e.g. π/6 radians (30°)), which may also be referred to as winding displacement or an angular displacement angle. Said another way, the dynamic interleaving method includes utilizing at least two different interleaving angles for a single displacement angle. That is, while the prior art envisions changing an interleaving angle for different displacement angles, these changes occur after the electric system is turned off and the interleaving angle is changed to a different interleaving angle.

As mentioned above, an exemplary angular displacement angle is π/6 radians (30°), which may also be referred to as winding displacement. The most suitable angular displacement angle for any given system may be determined based on a function of operating sectors for the inverters.

With specific reference to FIG. 1, a system utilizing a dynamic interleaving method is shown. DC current regulation is applied to two parallel interleaved inverters, which may be referred to as pulse width modulation (PWM) components. The PWM components provide the phase information to an overall inverter. The overall inverter is coupled with a battery and a DC-link capacitor. The overall inverter provides an output, which can be to a dual three-phase permanent magnet synchronous machine (PMSM).

Figure 2:
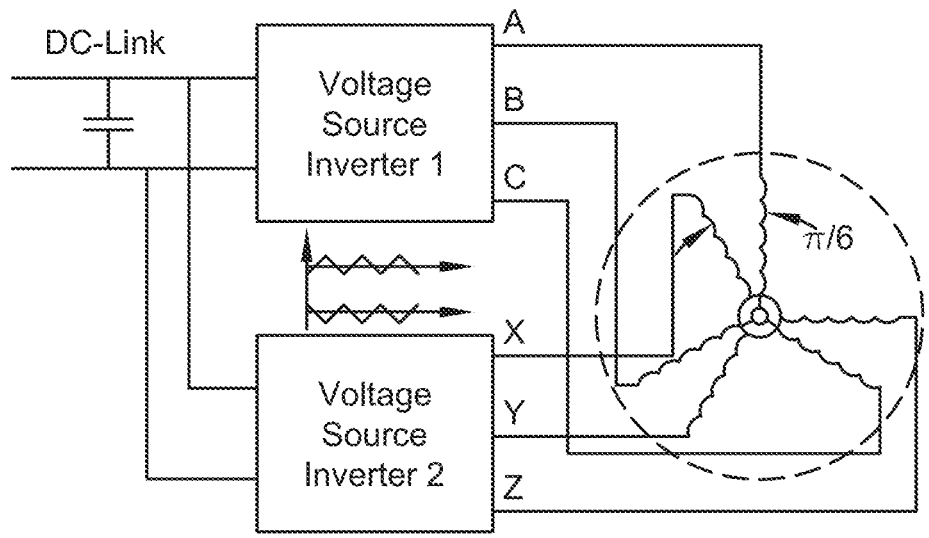
FIG. 2 is a schematic showing an alternative dual three phase electric machine with two parallel interleaved inverters.

With specific reference to FIG. 2, an alternative system utilizing a dynamic interleaving method is shown. DC current is provided to two parallel interleaved inverters, which may be referred to as voltage source inverters. The DC current supply includes a DC-link capacitor. The voltage source inverters provide phases as an output to a motor.

Figure 3:
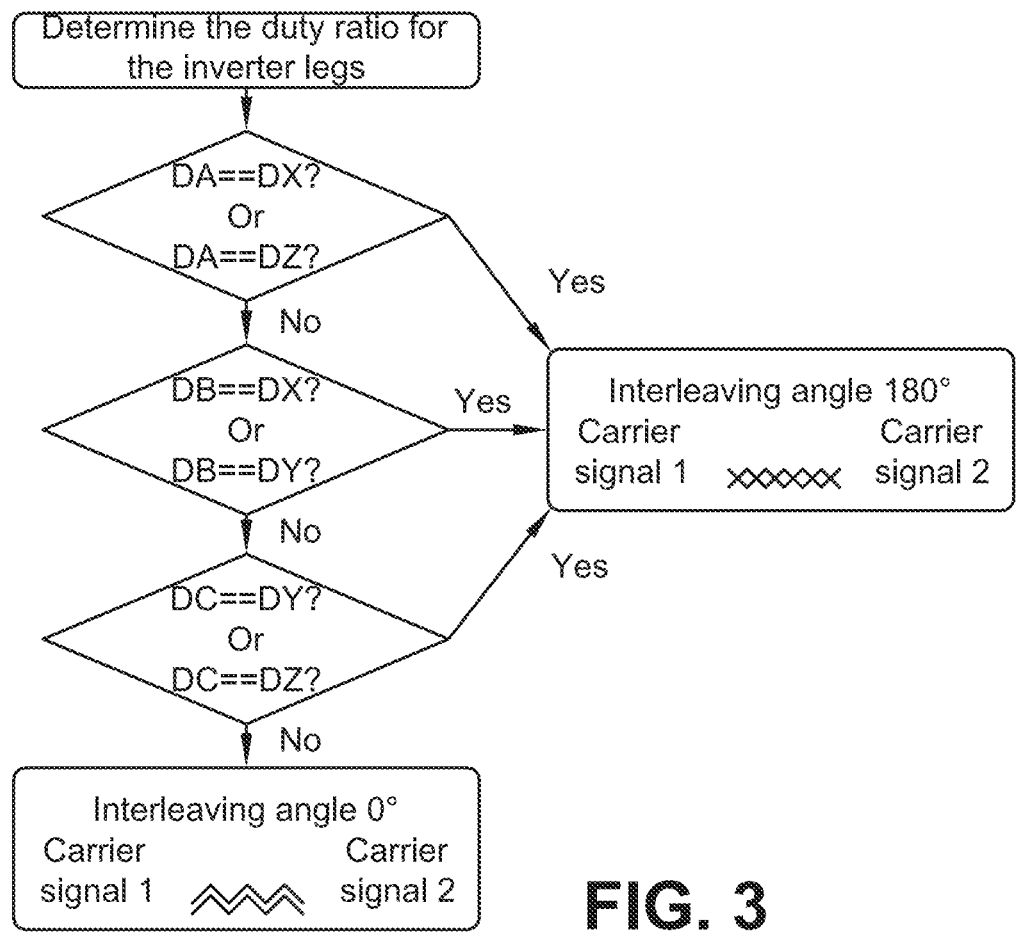
FIG. 3 is a flow chart showing conditional method steps for adjusting a dynamic interleaving angle ($\varphi$)

With specific reference to FIG. 3, a dynamic interleaving method is shown. Reference is also made to FIG. 2 and a step of providing a first one of the two parallel interleaved inverters including three phases (Phase A, Phase B, Phase C) and a second one of the two parallel interleaved inverters including three phases (Phase X, Phase Y, Phase Z). A next step can include determining a duty ratio for the phases, which may also be referred to as legs, of the two parallel interleaved inverters. Based on the determined duty ratios, one or more conditions can be analyzed.

Figure 4:
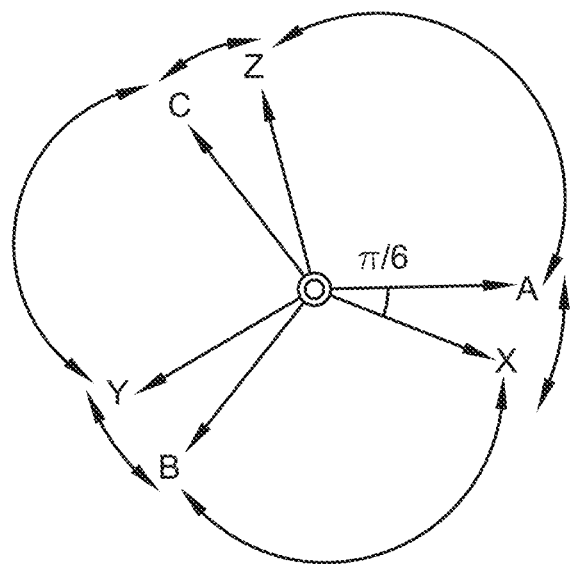
FIG. 4 is a phase sequence diagram of a dual three phase electric machine.

With specific reference to FIG. 4, a phase sequence diagram of a dual three phase electric machine is shown. From the phase sequence diagram of FIG. 4, any phase has two nearest phases. That is, the nearest phases of Phase A are Phase X and Phase Z. As a result, in-phase conditions can happen for either Phase A with Phase X and/or Phase A with Phase Z. Similarly, the in-phase conditions can occur for any of the following combinations: Phase B with Phase X, Phase B with Phase Y, Phase C with Phase Y, and Phase C with Phase Z. Therefore, a conditional analysis can include determining whether any of the nearby Phases are in-phase. During an in-phase condition, the interleaving angle should be at a first angle (e.g. 180°), while the rest of the time (that is, when any of the nearby Phases are not in-phase), the interleaving angle should be at a second angle (e.g. 0°).

With specific reference to FIG. 12, a dynamic interleaving method is shown. Reference is also made to FIG. 11 and a step of providing a coil-integrated inverter system. A next step can include determining a duty ratio for the phases, which may also be referred to as legs, of the multiple inverter legs. Based on the determined duty ratios, one or more conditions can be analyzed. In a similar manner as above, a conditional analysis can include determining whether any of the nearby Phases are in-phase. During an in-phase condition, the interleaving angle should be at a first angle (e.g. 180°), while the rest of the time (that is, when any of the nearby Phases are not in-phase), the interleaving angle should be at a second angle (e.g. 0°).

One or more embodiments of the dynamic interleaving method may be particularly applicable for a discontinuous pulse width modulation (DPWM) method. In other embodiments, a continuous pulse width modulation (PWM) method may be utilized, though this may lead to less efficient inverter performance. A DPWM method can include the duty ratio of the switches is either 1 or 0 for some time of the electrical cycle. An exemplary DPWM method is a discontinuous space vector pulse width modulation (SVPWM) method where switches are clamped to a positive or negative rail of a DC BUS for a certain portion of the electrical cycle. Several discontinuous SVPWM methods are available for a three-phase system, which can be directly applied to a dual three-phase PMSM system.

Aspects of suitable pulse width modulation (PWM) methods will be generally known to the skilled person, though certain details are disclosed here.

Certain PWM methods are known as 60 degree in-phase discontinuous methods (DPWM1). For DPWM1, in some portion of the electrical cycle, the duty ratio of Phase A and Phase X becomes equal by being 1 or 0. The same event is happening for Phase B and Phase Y, Phase C and Phase Z. This is true for any 60 degree DPWM method. Other examples include 30 degree lagging 60 degree DPWM method (DPWM2) and 30 degree leading 60 degree DPWM method (DPWM3). During those moments DC-link current of the inverters becomes in phase, and the rest of the time, DC-link current is becoming out of phase. During the in-phase conditions, the interleaving angle should be at a first angle (e.g. 180°), while the rest of the time (that is, when not in the in-phase conditions), the interleaving angle should be at a second angle (e.g. 0°).

For the 30 degree DPWM method (DPWM4), Phase A and Phase Z become equal (rather than Phase A and Phase X). A similar thing occurs for Phase B and Phase X, Phase C and Phase Y. The different interleaving angles can be correspondingly applied.

For the 120 degree DPWM methods, where the switch is completely on for one-third of the electrical cycle (DPWM-MAX) or completely off for one-third of the electrical cycle (DPWMMIN), sometimes Phase A and Phase X become equal, and sometimes Phase A and Phase Z become equal. During the in-phase condition, DC-link ripple is higher than the out of phase condition. The different interleaving angles can be correspondingly applied.

One or more embodiments of the dynamic interleaving method may be particularly useful for a permanent magnet synchronous machine (PMSM) drive. One or more embodiments of the dynamic interleaving method may be particularly useful for an induction machine.

Turning to certain formulas relative to the dynamic interleaving method, aspects of the system of FIGS. 1 to 3 are further disclosed. Since the two inverters are working in parallel, the total dc-link current of the drive will be the summation of the dc-link currents of the inverters. Dc-link current of the first inverter can be written as the summation of each leg current as in equation (1) below, where $A_m$ is the amplitude of the switching harmonics, $A_n$ is the amplitude of the phase current harmonic, $w_c$ is the carrier frequency, $w_e$ is the modulating angular frequency, and m and n are respectively the switching and phase current harmonic orders.

$$i_{DC1} = \sum_{m=0}^{\infty} \sum_{n=-\infty}^{\infty} A_m A_n e^{j(mw_c t + (n+1)w_e t)} \sum_{k=1}^{3} e^{j\frac{2\pi}{3}(k-1)} \quad (1)$$

Similarly, for the second inverter, the dc-link current can be written as equation (2) below. Here φ is the phase shift angle of the carrier to implement the interleaving and π/6 is the angle due to displacement between the two sets of three-phase windings.

$$i_{DC2} = \sum_{m=0}^{\infty} \sum_{n=-\infty}^{\infty} A_m A_n e^{j\{m(w_c t + \varphi) + (n+1)(w_e t - \frac{\pi}{6})\}} \sum_{k=1}^{3} e^{j\frac{2\pi}{3}(k-1)} \quad (2)$$

From equation (1) and equation (2), the total phase shift $\theta_{ps}$ between the dc-link currents of the inverters can be written as equation (3) below.

$$\theta_{ps} = m\varphi - (n+1)\frac{\pi}{6} \quad (3)$$

Depending on the value of m and n, an interleaving angle φ can be chosen so that the value of $\theta_{ps}$ will be π and that specific carrier harmonics can be eliminated through interleaving. This should be contrasted with a constant interleaving angle φ=90° where some of the harmonics will be eliminated (e.g. m=1, n=−2) while the rest of them remain (e.g. m=1, n=2). For the dynamic interleaving method disclosed herein, as the interleaving angle is not constant, depending on the value of m and n, all the harmonics can be canceled.

One or more embodiments of the present invention relate to a developed model and implementation thereof in a control algorithm. Upon implementing a dynamic interleaving method, the dc-link current can be utilized to develop one or more models. These developed models can be utilized for control algorithms for subsequent electric machines. That is, a developed model can be used to predict how a dynamic interleaving method might affect operation of any given electric machine, and this predicted information can be utilized within a control algorithm. Said another way, such model and algorithm and other analysis disclosed herein can be used for developing details (e.g. suitable phase shift) for additional and future phase and control configurations.

With reference to FIGS. 5 to 10, one or more embodiments of the present invention relate to a coil assembly including overlapping windings. The coil assembly 10 includes a plurality of phase coils 12. The phase coil 12 includes a first polar half 12A (FIG. 8) and a second polar half 12B, such that the overall phase coil 12 may be referred to as a bi-polar structure.

Each polar half 12A, 12B includes a first central linear portion 14 extending from a first outer perimeter arc portion 16. First central linear portion 14 and first outer perimeter arc portion 16 are at a top layer. Each polar half 12A, 12B includes a second central linear portion 18 extending from a second outer perimeter arc portion 20. Second central linear portion 18 and second outer perimeter arc portion 20 are at a bottom layer.

The first central linear portion 14 and the second central linear portion 18 extend toward a central overlapping portion. The central overlapping portion includes an inner first arc portion 22, which transitions to an upper second arc portion 24. The transition may be the upper second arc portion 24 slightly overlapping the inner first arc portion 22, which may also be referred to as a partial overlap.

Similarly, there is a transition from the top layer to the bottom layer between the first outer perimeter arc portion 16 and the second outer perimeter arc portion 20. The transition may be the upper first outer perimeter arc portion 16 slightly overlapping the second outer perimeter arc portion 20, which may also be referred to as a partial overlap.

Figure 8:
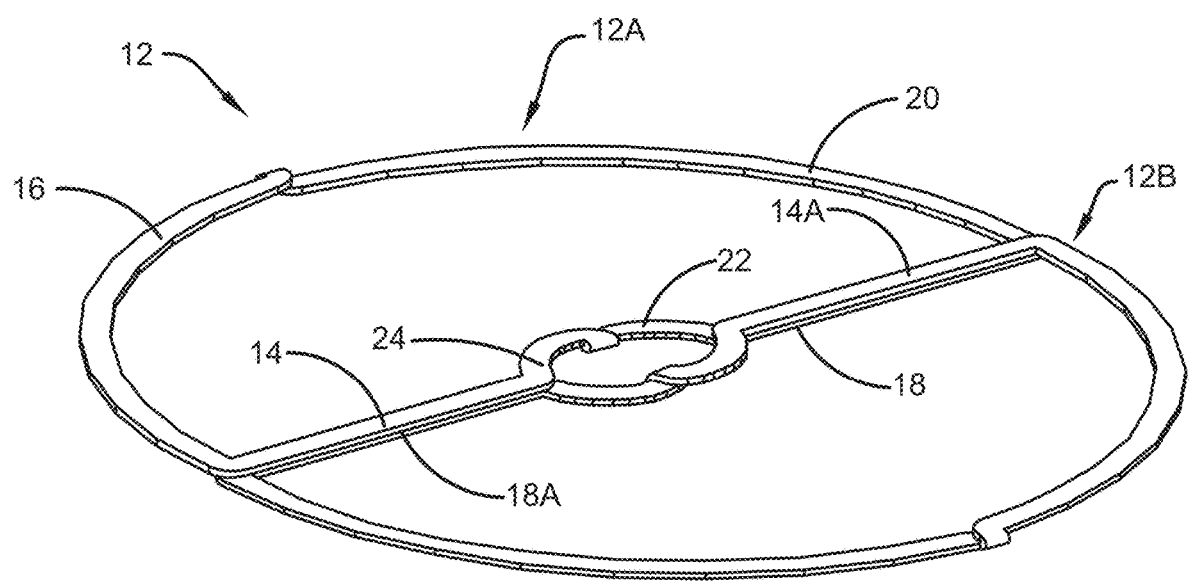
FIG. 8 is a perspective view of one phase coil of the coil assembly.
Figure 9:
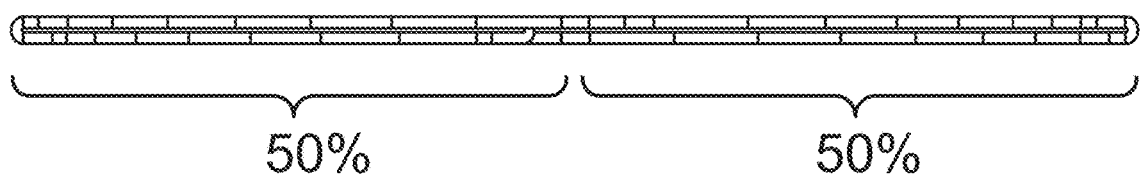
FIG. 9 is a front view of the one phase coil of the coil assembly.

As perhaps best seen in FIG. 8, each polar half 12A, 12B is shaped similarly and inner portions thereof are overlapped at the central linear portions. That is, first central linear portion 14A of polar half 12B overlaps the second central linear portion 18 of polar half 12A, and first central linear portion 14 of polar half 12A overlaps the second central linear portion 18A of polar half 12B. Taken together, the two polar halves 12A, 12B overlap to form the phase coil 12.

Figure 5:
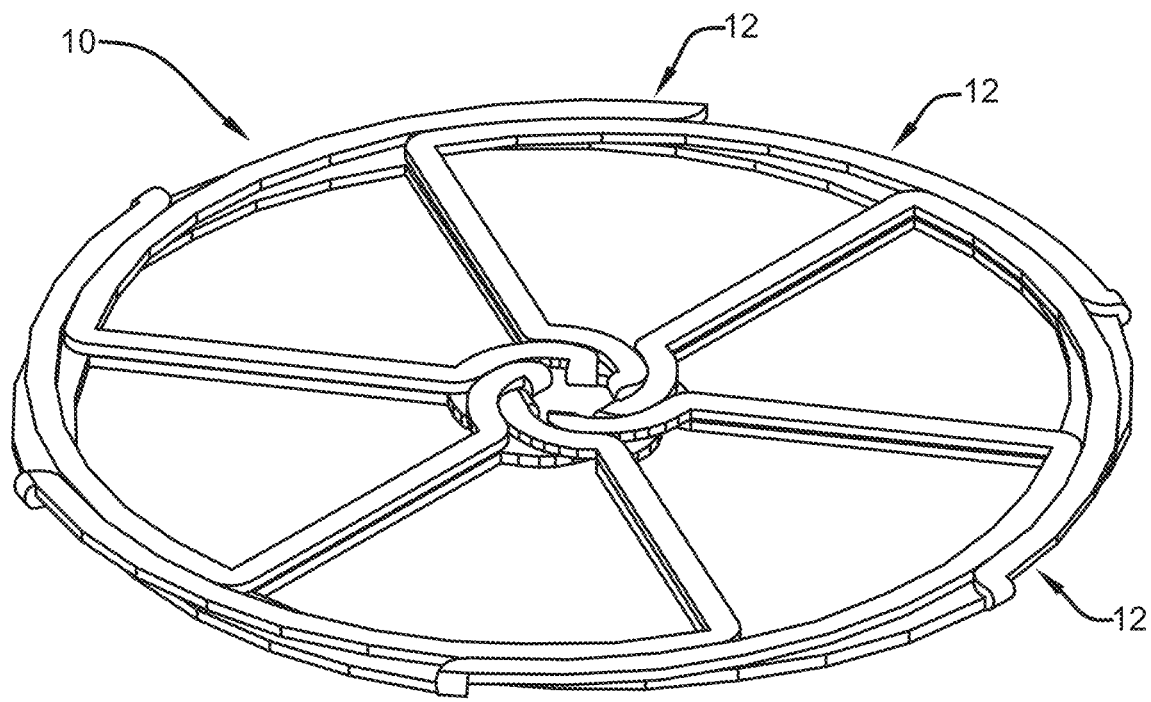
FIG. 5 is a perspective view of a coil assembly with overlapping windings.

As shown in FIG. 5, in one or more embodiments, three phase coils 12 can be utilized within the coil assembly. The shape of each phase coil 12 allows for all three to fit within a three phase configuration. A first end of the first outer perimeter arc portion 16 of a first phase coil 12 is internal to a second end of the first outer perimeter arc portion 16 of a second phase coil 12. A second end of the first outer perimeter arc portion 16 of a first phase coil 12 is external to a first end of the first outer perimeter arc portion 16 of a third phase coil 12. This configuration continues for all phase coils 12.

This configuration is similar, yet somewhat reversed, for the central overlapping portions. A first end of the upper second arc portion 24 of a first phase coil 12 is external to a second end of the upper second arc portion 24 of a second phase coil 12. A second end of the upper second arc portion 24 of a first phase coil 12 is internal to a first end of the upper second arc portion 24 of a third phase coil 12. This configuration continues for all phase coils 12.

The embodiment shown in FIG. 5 may be referred to as a three-phase, two-layer system. Other suitable numbers of phases and layers may be utilized. Other exemplary numbers of phases and layers include four, five, and six, and other suitable numbers. For any number of phases utilized, the coil assembly will utilize an overlapping winding configuration. The specific configuration of the overlap, such as the overlapping angle, can be adjusted based on any particularly utilized numbers of phases and layers.

As an alternative description of the coil assembly 10, the overall coil structure of the coil assembly 10 is generally circular shaped with overlap between the bipolar structures for the phases every 60 degrees towards the center. Coil current will eventually flow clockwise on one half and anti-clockwise on the other half on each phase coil 12.

It will be appreciated by the skilled person that the coil assembly structure disclosed in FIGS. 5 to 10 is a disclosure of the shapes into which wound wires, which may also be referred to as windings, will be formed into. Other aspects relative to preparing windings, and details and design thereof, will be generally known to the skilled person relative to the disclosure provided herein.

Figure 6:
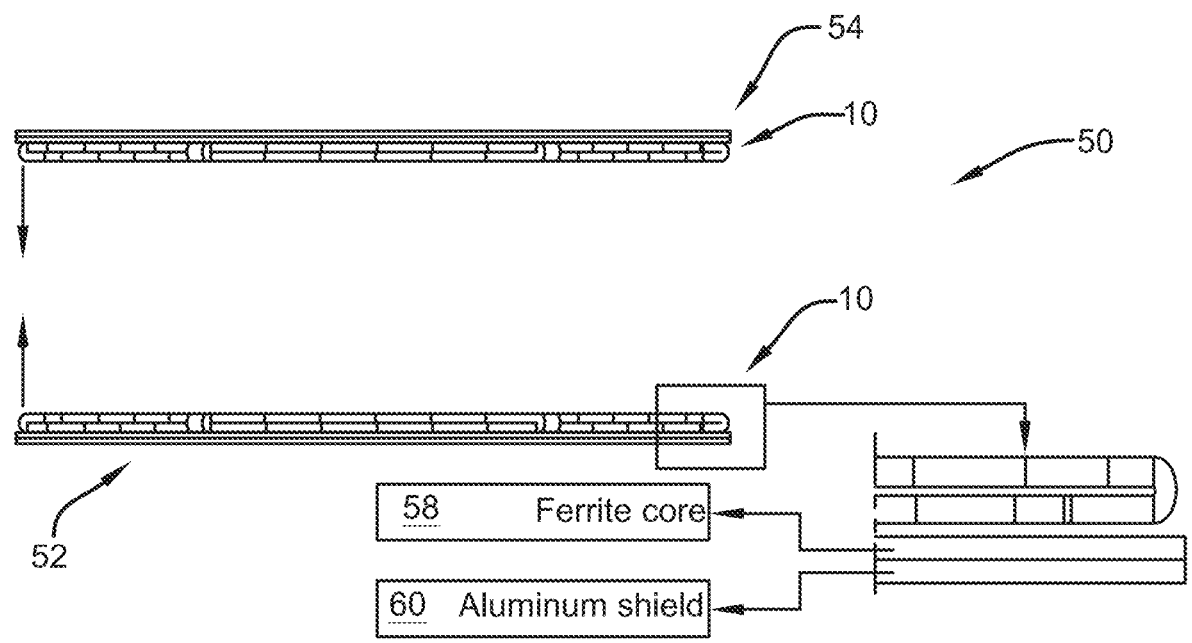
FIG. 6 is a front view of a wireless charging system including the coil assembly with overlapping windings.
Figure 7:
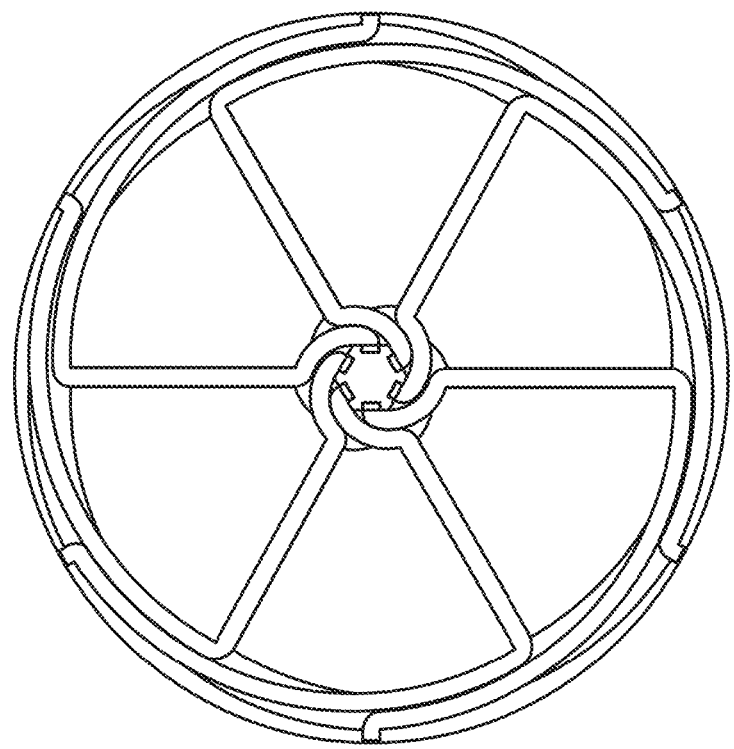
FIG. 7 is a top view of half of the wireless charging system.
Figure 10:
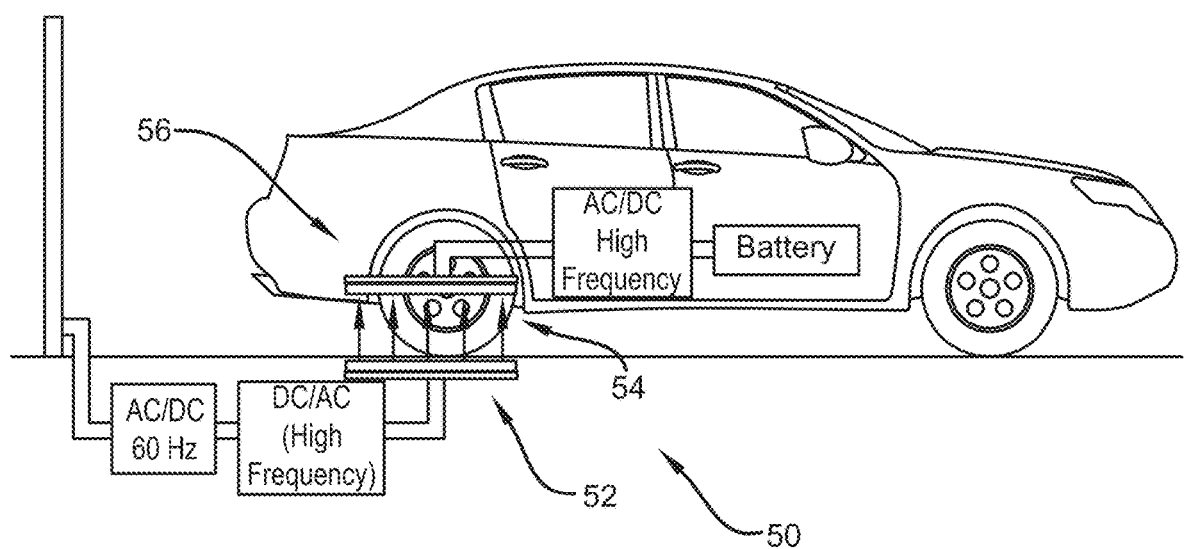
FIG. 10 is a schematic showing two coil assemblies in a wireless charging system.

With reference to FIG. 6 and FIG. 10, a wireless charging system 50 includes two charging pads: a transmitter (Tx) 52 and a receiver (Rx) 54. Transmitter 52 includes a first coil assembly 10. Receiver 54 includes a second coil assembly 10. As shown in FIG. 6, the first coil assembly 10 and the second coil assembly 10 should face each other in the charging configuration.

The receiver 54 couples power from the transmitter 52 through electromagnetic induction. For an automotive use, the transmitter 52, which may be referred to as a pad, can be buried in the ground while the receiver 54, which may be referred to as a pad, can be attached upside down to a vehicle chassis 56. For charging to begin, the first coil assembly 10 and the second coil assembly 10 should face each other in generally perfect alignment to transfer power effectively.

As shown in FIG. 6, transmitter 52 and receiver 54 can each include a relatively highly magnetic permeable ferrite core 58 and a relatively highly conductive aluminum sheet 60. The ferrite core 58 is layered proximate the coil assembly 10 such that ferrite core 58 is between coil assembly 10 and aluminum sheet 60. Since electric vehicle charging wireless power transfer (WPT) systems generally deal with a significantly large airgap between the pads (i.e. pads 52, 54), the amount of flux leakage may be relatively high. The ferrite core 58 and aluminum shield 60 may assist with reducing the leakage and increasing power transfer capability to the vehicle. The ferrite layer 58 helps orient the flux between the pads 52, 54 in the axial direction. The aluminum shield 60 also limits the electromagnetic leakage to the surroundings.

An additional aluminum shield (not shown) may be placed in the vehicle in addition to the aluminum shield 60 attached to receiver 54 to further reduce emissions inside the vehicle for passenger protection.

Advantageously, the coil assembly 10 and wireless charging system 50 of one or more embodiments of the present invention provide improvements relative to higher power density and lower losses.

Examples

A drive system was prepared for analyzing a dynamic interleaving method relative to methods utilizing no interleaving and fixed interleaving. The drive system utilized two inverters in accord with the disclosure relative to FIGS. 1 to 4.

Figure 13:
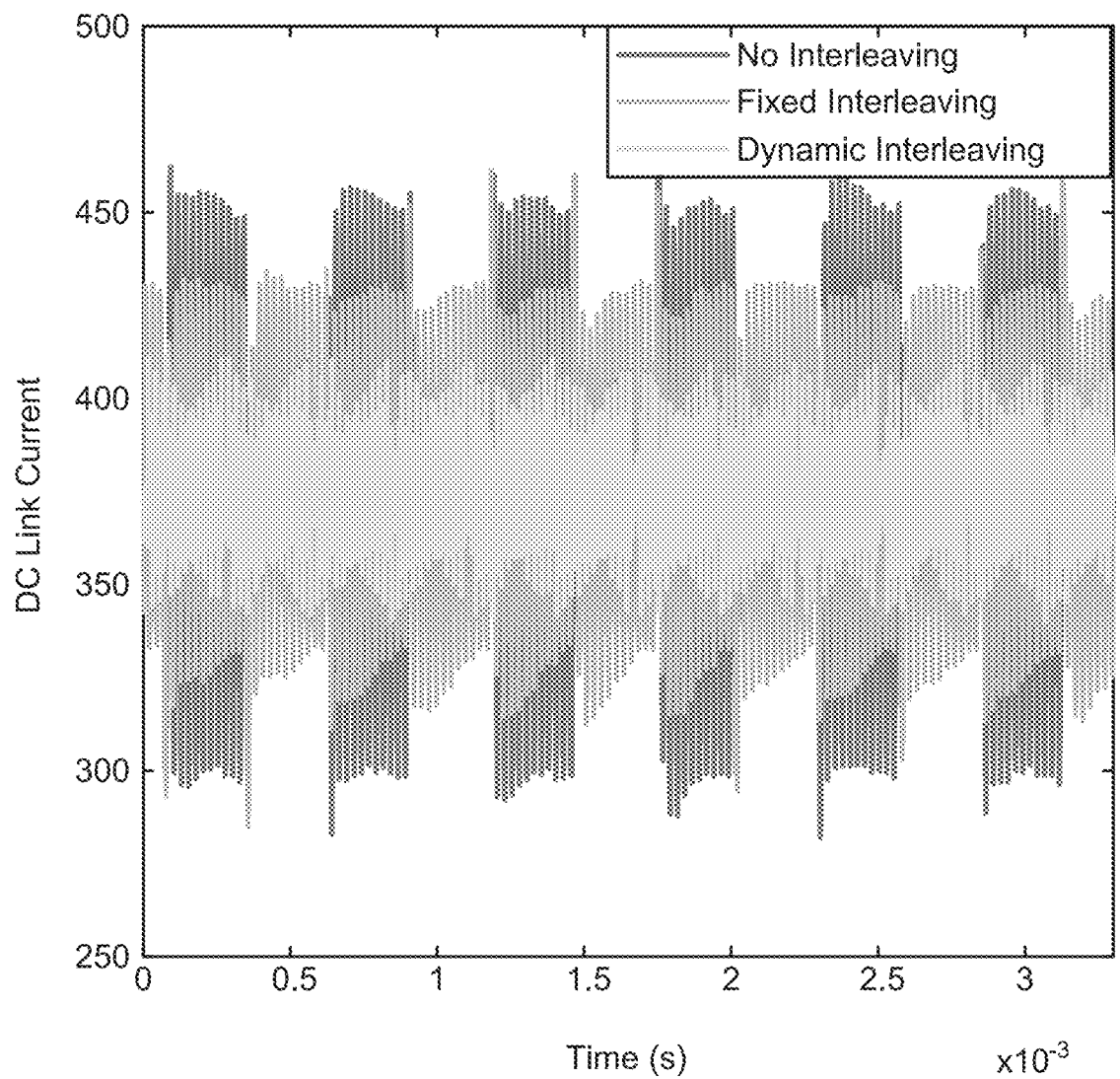
FIG. 13 is a graph showing dc-link current for a battery for a dynamic interleaving method relative to no interleaving and fixed interleaving.
Figure 14:
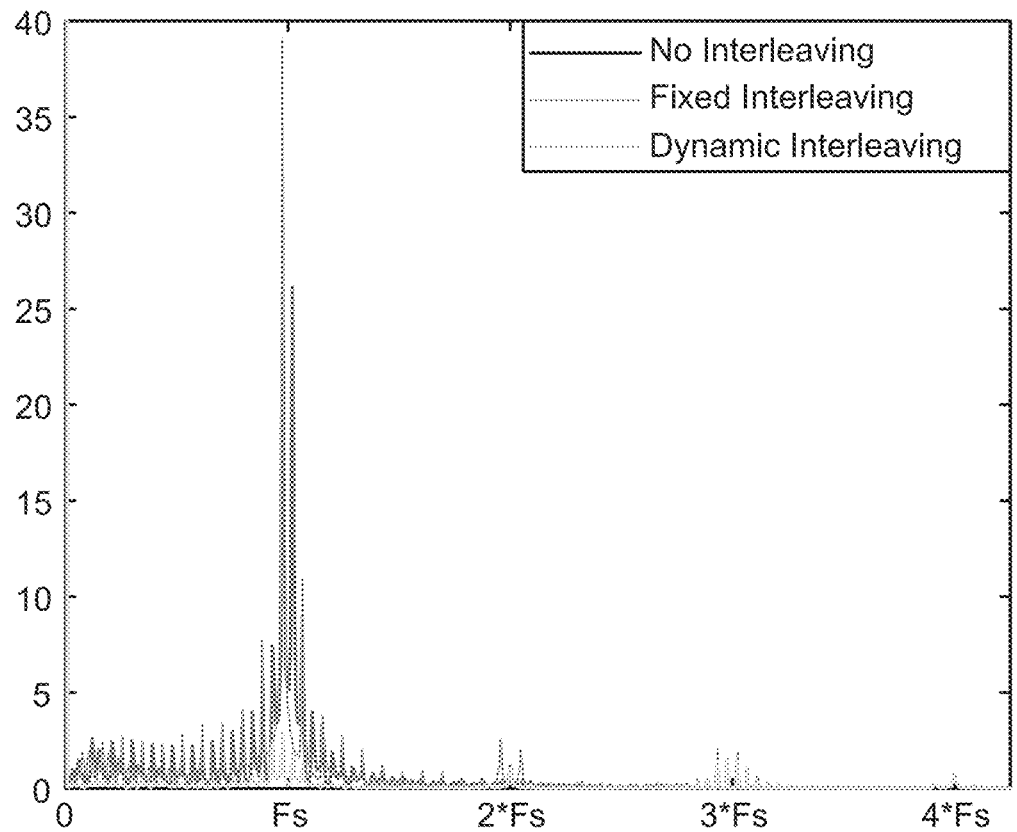
FIG. 14 is a graph showing zoomed fast Fourier transform (FFT) for a dynamic interleaving method relative to no interleaving and fixed interleaving.

For FIG. 13 and FIG. 14, a 30 degree lagging 60 degree DPWM method (DPWM2) method was utilized. FIG. 13 is a graph showing dc-link current for a battery of the drive system for a dynamic interleaving method relative to no interleaving and fixed interleaving. The dynamic interleaving shows significant improvement. FIG. 14 is a graph showing zoomed fast Fourier transform (FFT) for a dynamic interleaving method relative to no interleaving and fixed interleaving. The harmonics in the switching frequency were reduced significantly while using the dynamic interleaving method. All the sidebands of the switching frequency harmonics were eliminated by using the dynamic interleaving method, while for the fixed interleaving method, some of the sidebands were not eliminated.

Figure 15:
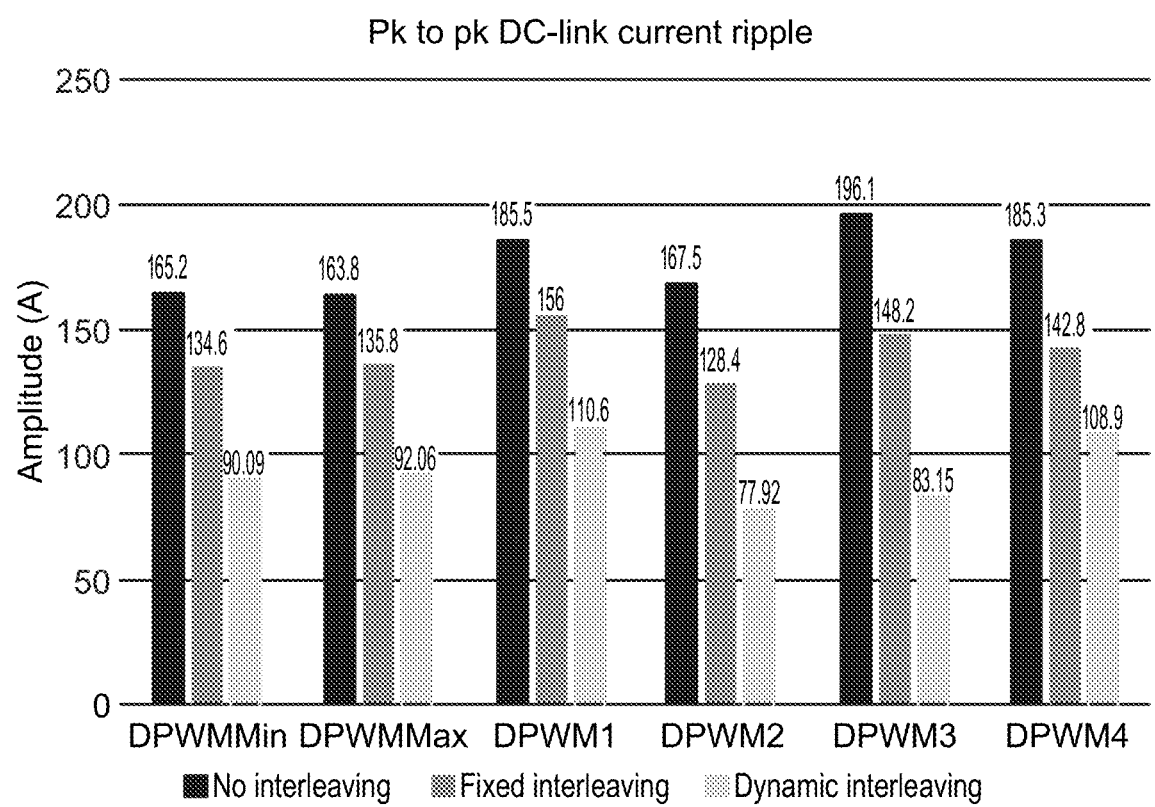
FIG. 15 is a graph showing pk to pk DC-link current ripple for various discontinuous pulse width modulation (DPWM) method for a dynamic interleaving method relative to no interleaving and fixed interleaving.
Figure 16:
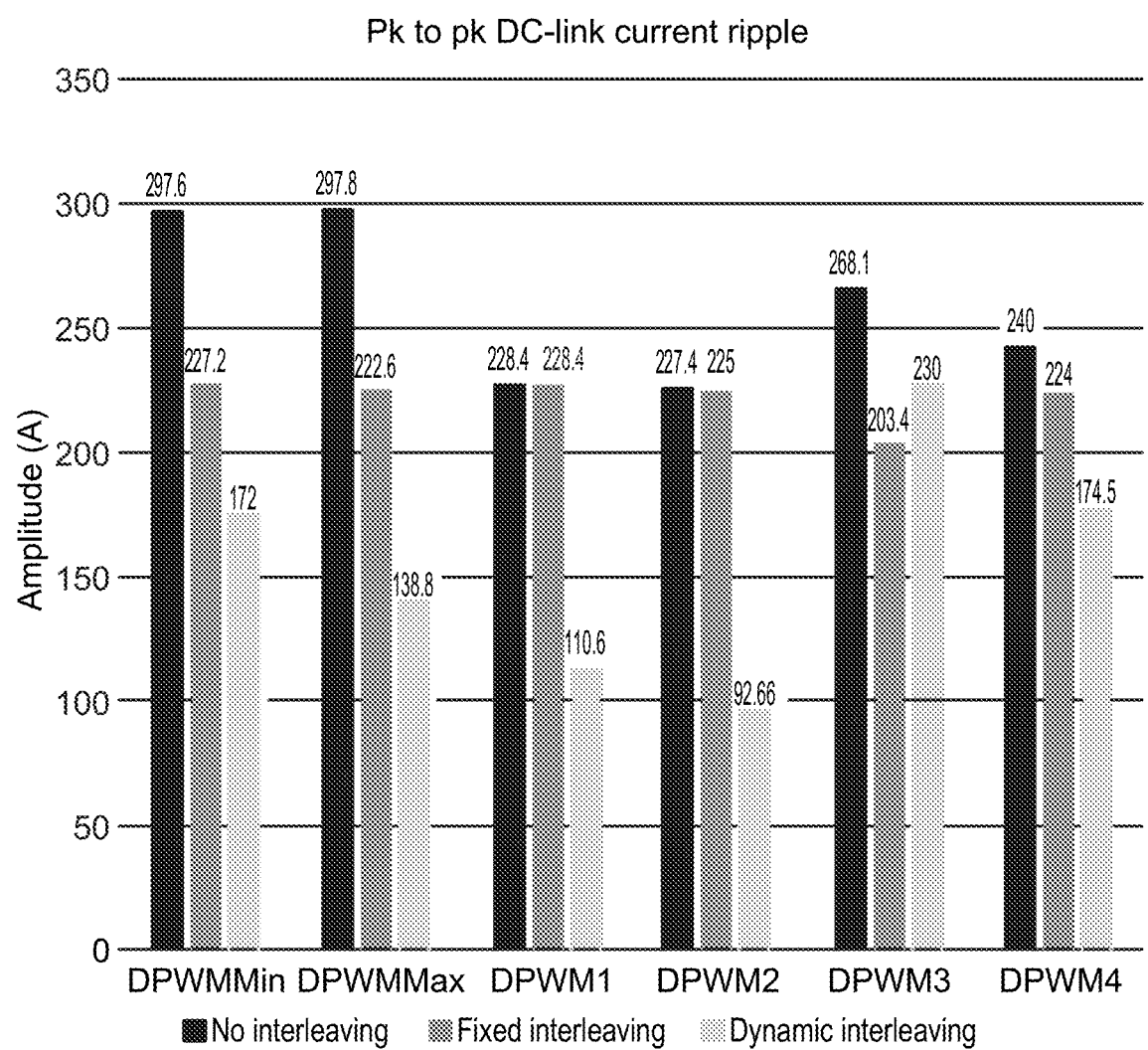
FIG. 16 is a graph showing DC-link capacitor RMS current for various DPWM methods for a dynamic interleaving method relative to no interleaving and fixed interleaving.

For FIG. 15 and FIG. 16, various DPWM methods were utilized. Specifically, the methods included DPWMMIN, DPWMMAX, DPWM1, DPWM2, DPWM3, and DPWM4, which are discussed above. FIG. 15 is a graph showing pk to pk DC-link current ripple for the various DPWM methods for a dynamic interleaving method relative to no interleaving and fixed interleaving. FIG. 15 shows the pk to pk DC-link current ripple was reduced significantly while using the dynamic interleaving method, compared to the no interleaving and fixed interleaving methods. FIG. 16 is a graph showing DC-link capacitor RMS current for the various DPWM methods for a dynamic interleaving method relative to no interleaving and fixed interleaving. FIG. 16 shows the DC-link capacitor RMS current was reduced significantly while using the dynamic interleaving method, compared to the no interleaving and fixed interleaving methods.

In light of the foregoing, it should be appreciated that the present invention advances the art by providing an improved dynamic interleaving method and an improved three phase wireless charging system. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of operating a motor, the method comprising steps of
providing an electric system coupled with the motor, the electric system including parallel inverter legs, the electric system including two parallel interleaved inverters, wherein the two parallel interleaved inverters are at an angular displacement angle;
subjecting the motor to a first interleaving angle when the electric system is under a first condition; and
subjecting the motor to a second interleaving angle different from the first interleaving angle when the electric system is under a second condition;
wherein the steps of subjecting the motor to the first interleaving angle and subjecting the motor to the second interleaving angle occur within continuous operation of the electric system and the motor.

2. The method of claim 1, wherein the angular displacement angle is 30°.

3. The method of claim 1, further comprising a step of developing a model of dc-link current of the electric system.

4. The method of claim 3, further comprising a step of utilizing the model for a control algorithm of a second electric system.

5. The method of claim 1, wherein one of the two parallel interleaved inverters includes a first set of three phases and wherein another one of the two parallel interleaved inverters includes a second set of three phases, such that a first phase of the first set of three phases will be nearby with two phases of the second set of three phases to thereby provide nearby phases.

6. The method of claim 5, wherein the first condition is a duty ratio in any pair of the nearby phases being 1 or 0 and wherein the second condition is the duty ratio in any pair of the nearby phases not being 1 or 0.

7. The method of claim 6, wherein the first interleaving angle is 180° and wherein the second interleaving angle is 0°.

8. The method of claim 1, wherein the electric system utilizes a discontinuous pulse width modulation (DPWM) method.

9. The method of claim 8, wherein the discontinuous pulse width modulation method is a discontinuous space vector pulse width modulation (SVPWM) method.

10. The method of claim 1, wherein the motor is a permanent magnet synchronous motor.

11. The method of claim 1, wherein the motor is an induction motor.

12. A method of operating a motor, the method comprising steps of
providing an electric system coupled with the motor, the electric system including parallel inverter legs, the electric system including two parallel interleaved inverters, wherein the two parallel interleaved inverters are at an angular displacement angle determined as a function of operating sectors for the two parallel interleaved inverters;
subjecting the motor to a first interleaving angle when the electric system is under a first condition; and
subjecting the motor to a second interleaving angle different from the first interleaving angle when the electric system is under a second condition;
wherein the steps of subjecting the motor to the first interleaving angle and subjecting the motor to the second interleaving angle occur within continuous operation of the electric system and the motor.

13. A method of operating a motor, the method comprising steps of
providing an electric system coupled with the motor, the electric system including parallel inverter legs, wherein the parallel inverter legs are part of a coil-integrated inverter system having a distributed inverter system, wherein the distributed inverter system includes a first plurality of inverter legs and a second plurality of inverter legs, wherein the first plurality of inverter legs is at an angular displacement angle relative to the second plurality of inverter legs;
subjecting the motor to a first interleaving angle when the electric system is under a first condition; and
subjecting the motor to a second interleaving angle different from the first interleaving angle when the electric system is under a second condition;
wherein the steps of subjecting the motor to the first interleaving angle and subjecting the motor to the second interleaving angle occur within continuous operation of the electric system and the motor.

14. The method of claim 13, wherein the angular displacement angle is 30°.

15. A method of operating a motor, the method comprising steps of
providing an electric system coupled with the motor, the electric system including parallel inverter legs, the electric system including two parallel interleaved inverters, wherein the two parallel interleaved inverters are at an angular displacement angle;
allowing the motor to experience a first interleaving angle when the electric system is under a first condition; and
allowing the motor to experience a second interleaving angle different from the first interleaving angle when the electric system is under a second condition;
wherein the steps of allowing the motor to experience the first interleaving angle and allowing the motor to experience the second interleaving angle occur within continuous operation of the electric system and the motor.

16. The method of claim 15, wherein the angular displacement angle is 30°.

17. The method of claim 15, wherein one of the two parallel interleaved inverters includes a first set of three phases and wherein another one of the two parallel interleaved inverters includes a second set of three phases, such that a first phase of the first set of three phases will be nearby with two phases of the second set of three phases to thereby provide nearby phases.

18. The method of claim 17, wherein the first condition is a duty ratio in any pair of the nearby phases being 1 or 0 and wherein the second condition is the duty ratio in any pair of the nearby phases not being 1 or 0.

* * * * *